United States Patent [19]
Vander Mey

[11] Patent Number: 5,278,862
[45] Date of Patent: Jan. 11, 1994

[54] TIMING FOR SPREAD-SPECTRUM COMMUNICATION ACROSS NOISY MEDIA

[75] Inventor: Timothy J. Vander Mey, Ocala, Fla.
[73] Assignee: Intellon Corporation, Ocala, Fla.
[21] Appl. No.: 863,213
[22] Filed: Apr. 3, 1992
[51] Int. Cl.$^5$ .............................................. H04L 27/30
[52] U.S. Cl. ........................................ 375/1; 380/34; 375/8; 375/96; 375/107; 379/93
[58] Field of Search ............ 375/1, 96, 107, 110, 375/7, 8; 380/34; 370/18, 85.2, 85.3; 379/93

[56] References Cited

U.S. PATENT DOCUMENTS

| | | | |
|---|---|---|---|
| 4,037,159 | 7/1977 | Martin | 375/1 |
| 4,100,498 | 7/1978 | Alsup et al. | 375/1 X |
| 4,244,053 | 1/1981 | Clinch et al. | 380/34 |
| 4,409,593 | 10/1983 | Bose | 370/85.2 X |
| 4,468,792 | 8/1984 | Baker et al. | 375/1 X |
| 4,656,642 | 4/1987 | Apostolos et al. | 375/1 |

*Primary Examiner*—Bernarr E. Gregory
*Attorney, Agent, or Firm*—Fish & Richardson

[57] ABSTRACT

A method of transmitting and receiving data packets across a noisy communication medium, e.g., an AC power line. The data packets are transmitted using spread-spectrum chirps. A first sequence of the chirps forms a contention-resolution preamble used by transmitters to resolve conflicting contentions for access to the communication medium. The preamble is followed by a second sequence of chirps that form a start-of-packet symbol used by receivers to delineate the start of data within the packet. To simplify detection at the receiver, identical chirps are used in the preamble and the start-of-packet symbol. To enable the receiver to avoid erroneously interpreting preamble chirps as start-of-packet chirps, and thereby erroneously begin to accept packet data, chirps in the preamble are transmitted at a different pitch (i.e., different time period between inception of successive chirps) from chirps in the start-of-packet symbol.

24 Claims, 6 Drawing Sheets

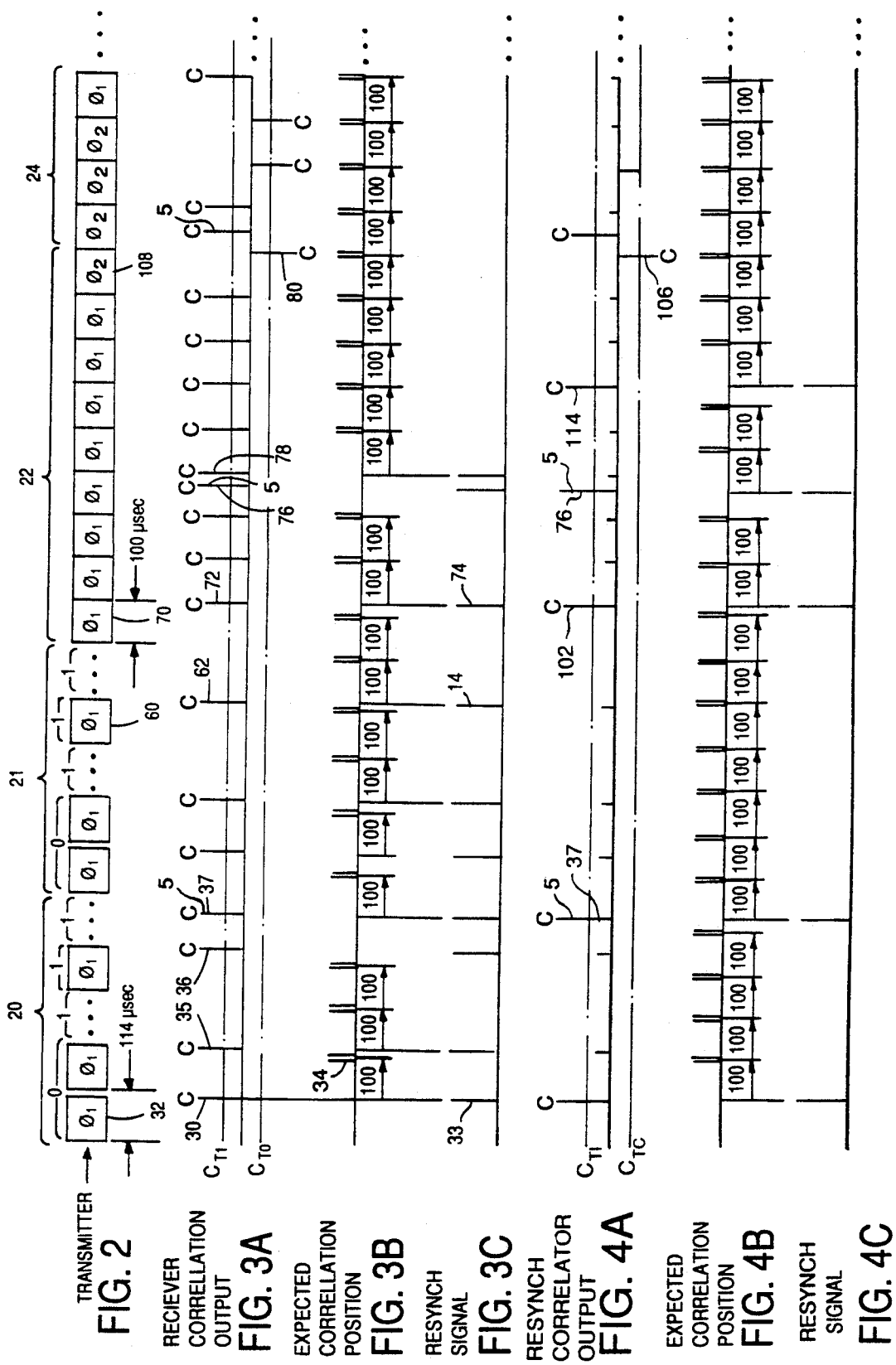

AMPLITUDE SHIFT KEYING (ASK) "1101"

PHASE REVERSAL KEYING (PRK) "1101"

TIMING FOR SPREAD-SPECTRUM COMMUNICATION ACROSS NOISY MEDIA

BACKGROUND OF THE INVENTION

This invention relates to chirp spread-spectrum communication systems, and in particular to such systems used on noisy network media, such as power lines.

Spread spectrum communication is a method whereby information is communicated using a bandwidth that greatly exceeds that required by information theory. Since these methods provide their signals over a wide bandwidth, they may be immune to large amounts of noise within that bandwidth. In chirp spread-spectrum method, a signal burst known as a chirp is transmitted. Each chirp has energy spread across a frequency range. The frequency spread may be achieve by frequency sweeping or other known techniques (such a direct sequence). The chirps may be sent in succession and modulated with information to be communicated to a receiver. A filter in the receiver is matched to the chirp, enabling a chirp to be detected in the presence of noise (a term which we use collectively to refer to all impairments to the communications channel).

My U.S. Pat. No. 5,090,024, entitled SPREAD-SPECTRUM COMMUNICATIONS SYSTEM FOR NETWORKS, issued Feb. 18, 1992, is herein incorporated by reference. The patent describes a system for communicating over power lines, and the like, that employs chirp spread-spectrum communication techniques.

In a communication network, several transmitters and receivers may communicate with each other over a network medium. In certain networks, collision (or contention) resolution strategies are implemented to resolve situations in which two or more transmitters simultaneously require use of the network medium.

SUMMARY OF THE INVENTION

In general, the invention features an improved method of transmitting and receiving data packets across a noisy communication medium, e.g., an AC power line. The data packets are transmitted using spread-spectrum chirps. A first sequence of the chirps forms a contention-resolution preamble used by transmitters to resolve conflicting contentions for access to the communication medium. The preamble is followed by a second sequence of chirps that form a start-of-packet symbol used by receivers to delineate the start of data within the packet. To simplify detection at the receiver, similar chirps are used in the preamble and the start-of-packet symbol. To enable the receiver to avoid erroneously interpreting preamble chirps as start-of-packet chirps, and thereby erroneously begin to accept packet data, chirps in the preamble are transmitted at a different pitch (i.e., the time period between inception of successive chirps differs for the preamble and the start-of-packet symbol). In the preferred embodiment, preamble pitch is 114 $\mu$sec, and the data pitch is 100 $\mu$sec.

Preferably, the receivers respond to detected chirps in the same manner whether they are from the preamble or the start-of-packet symbol. Upon detection of a chirp, a receiver "resynchronizes" to that chirp, and begins looking for subsequent chirps at the data pitch (e.g., 100 $\mu$sec intervals following the detected chirp). If more than one transmitter is still contending for access to the channel, the receiver will detect chirps at other than times prescribed by the data pitch (an "out of synch" chirp), and it will resynchronize once again. This resynchronization allows the receiver to remain "agile", i.e., able to synchronize immediately on newly detected chirps, so that it is ready to read the start-of-packet symbol from whichever transmitter survives the contention resolution process.

In preferred embodiments, the spread spectrum chirps are identical except for their phase, which is either 0° or 180°. The same chirps are used in the preamble and the data packet. The receiver has a correlator, or matched filter, that produces a pulse when a chirp is detected. Chirps that have been corrupted by noise produce weaker correlator outputs. Correlator outputs are compared to a predetermined threshold, and actions are based on whether an output exceeds the threshold (e.g., an out-of-synch chirp received during the contention resolution process only causes a resynchronization if the correlator output is above threshold). The receiver continually adjusts the data pitch time period based on the timing of actual correlator output peaks. The preamble is transmitted using ASK modulation, whereas PRK is used for the body of the packet. Symbols in the body are transmitted using pulse-width modulation (e.g., two chirps of the same phase, followed by a phase reversal, represent one logical state, whereas a single chirp, followed by a phase reversal, represents another state). Once the start-of-packet symbol has been successfully detected the receiver ignores spurious above-threshold correlator outputs (i.e., ones that do not occur at approximately the data pitch).

Processing gain is enhanced during reception of data by synchronizing to the 100-$\mu$sec pitch of the data chirps, and making decoding decisions based solely on the polarity of the correlator output (e.g., whether the output is above or below a nominal value). The correlator output is sampled at times prescribed by the data pitch, and decoding based solely on polarity continues so long as there is an above-threshold output within a preset number of data time periods (e.g., at least one above-threshold output every fourteen 100$\mu$sec intervals). If an above-threshold output is not detected within that time period, the receiver concludes it has lost "carrier", and so informs the host device.

Processing gain for reception of the start-of-packet symbol is made comparable to that for reception of data by relaxing the degree to which the received pattern of chirps must match the transmitted start-of-packet symbol. Eight chirps of the same phase (e.g., 11111111), followed by a change of phase, are transmitted as the start-of-packet symbol, but the receiver need only receive two of the eight chirps at above threshold, and only the final three chirps and the chirp with reverse phase must be detected with the correct polarity (e.g., 1110).

Other features and advantages will be apparent from the following description of preferred embodiments, and from the claims.

BRIEF DESCRIPTION OF THE DRAWINGS

FIG. 2 is an idealized diagrammatic plot of the signal generated by a typical transmitter that successfully contends for access to the communication medium.

FIGS. 3A-3C are idealized timing diagrams for one receiver listening to the communication medium.

FIGS. 4A-4C are idealized timing diagrams for another receiver listening to the communication medium, with the effects of channel impairments and noise on the receiver correlator output shown.

FIGS. 5A-5D are idealized timing diagrams for still another receiver listening to the communication medium (for a portion of the time period shown in FIGS. 3A-3C and 4A-4C).

DESCRIPTION OF PREFERRED EMBODIMENTS

Figure 1A:
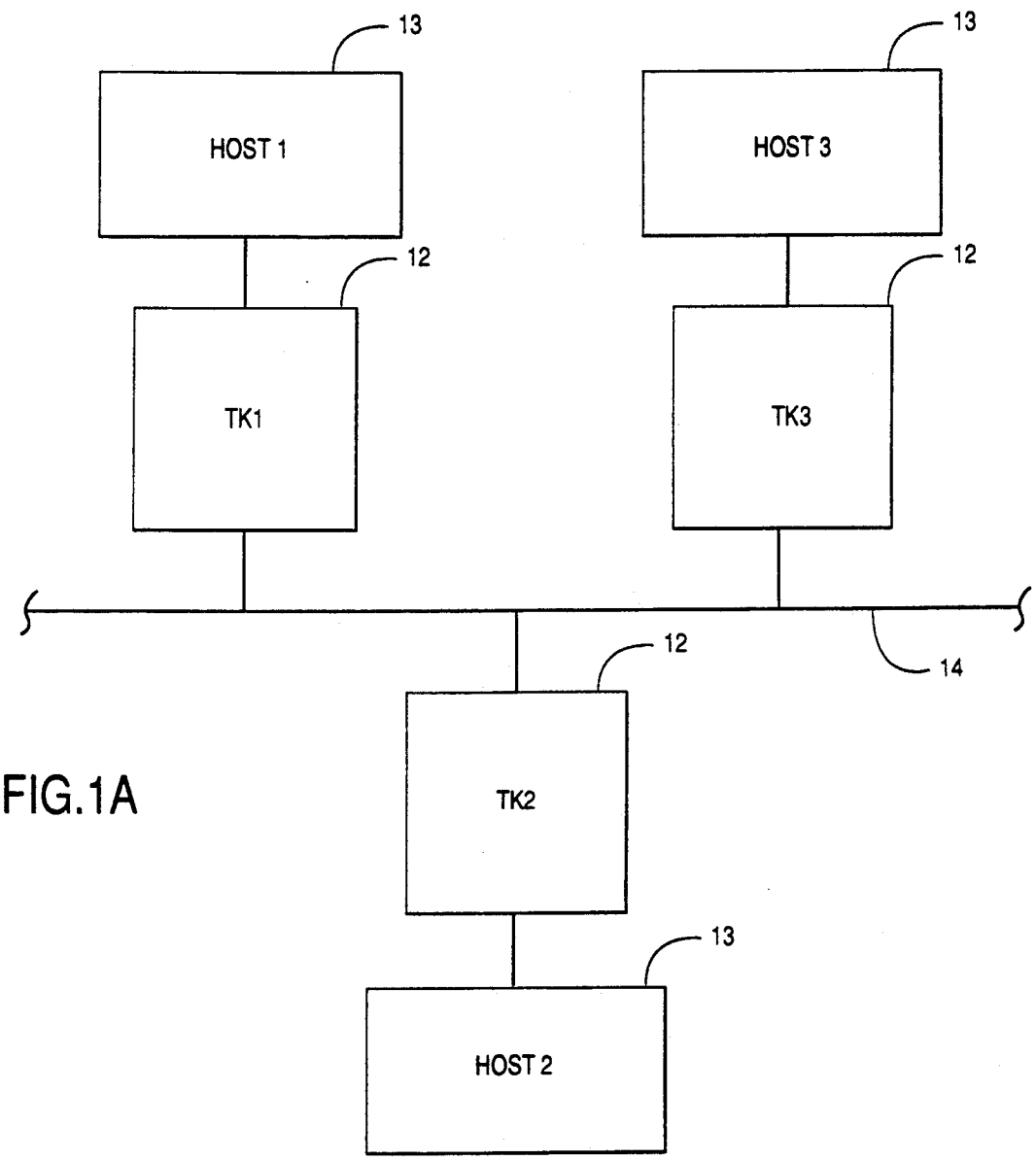
FIG. 1A is a block diagram of a network according to the invention.
Figure 1B:
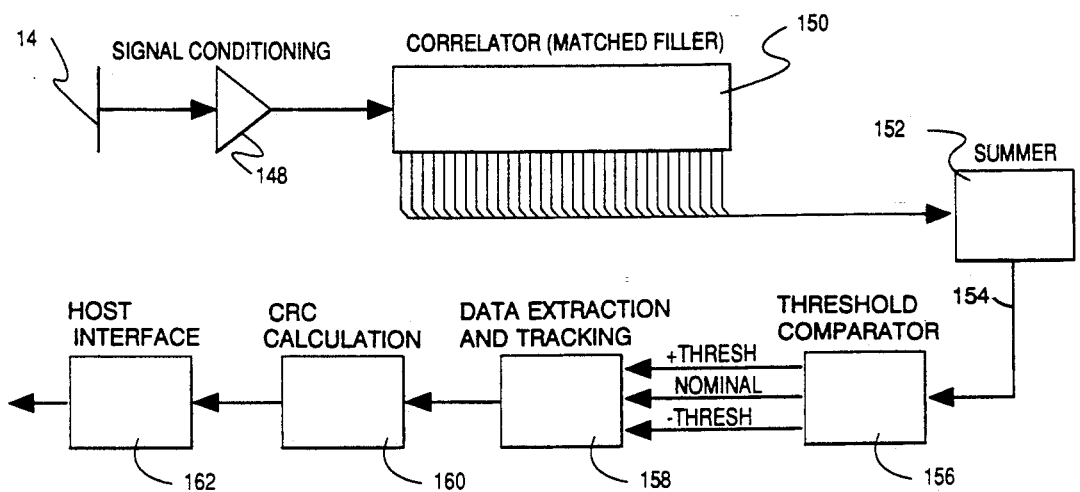
FIGS. 1B-1C are high-level block diagrams of a typical power-line modem connected to the network.
Figure 1C:
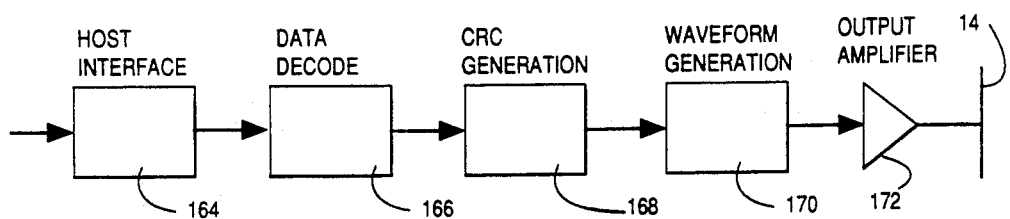

Referring to FIGS. 1A-1C, a communication network 10 includes a plurality of powerline modems 12 and associated host devices 13. Each modem is capable of transmitting and receiving packets of data over a communication medium 14, which is typically a noisy medium, such as an AC power line. In general, the modems transmit data over the medium by generating a series of spread-spectrum chirps, as described in my earlier mentioned co-pending application. Each modem on the network has a transmitter portion (FIG. 1C) and a receiver portion (FIG. 1B). The portions of the receiver and transmitter that pertain to the invention are shown in the figures in a simplified block diagram.

The receiver (FIG. IB) includes signal conditioning circuitry 148 (and other input circuits not shown) and a correlator (matched filter) 150 constructed to detect the presence of chirps and to produce, in conjunction with summer 152, a correlator output 154. The correlator output is compared to thresholds (at 156). Signals indicating whether the correlator output exceeds a positive threshold, nominal, or a negative threshold are used in data extraction and tracking (at 158). A cyclical redundancy code (CRC) is calculated (at 160). Decoded data and other information is provided to the host by a host interface 162.

The transmitter (FIG. 1C) includes a host interface 164, data decoding (at 166), CRC generation (at 168), waveform generation (at 170), and an output amplifier 172 (and other output circuits not shown).

Referring to FIG. 2, each transmitted packet begins with a contention-resolution preamble 20, followed by a start-of-packet symbol 22 (a predetermined initial sequence of chirps), and then by the packet body data 24. Although not shown, each packet terminates with an end-of-packet symbol (EOP), and is followed by an error-detection cyclical redundancy code (CRC).

Figures 5A, 5B, 5C, 5D:
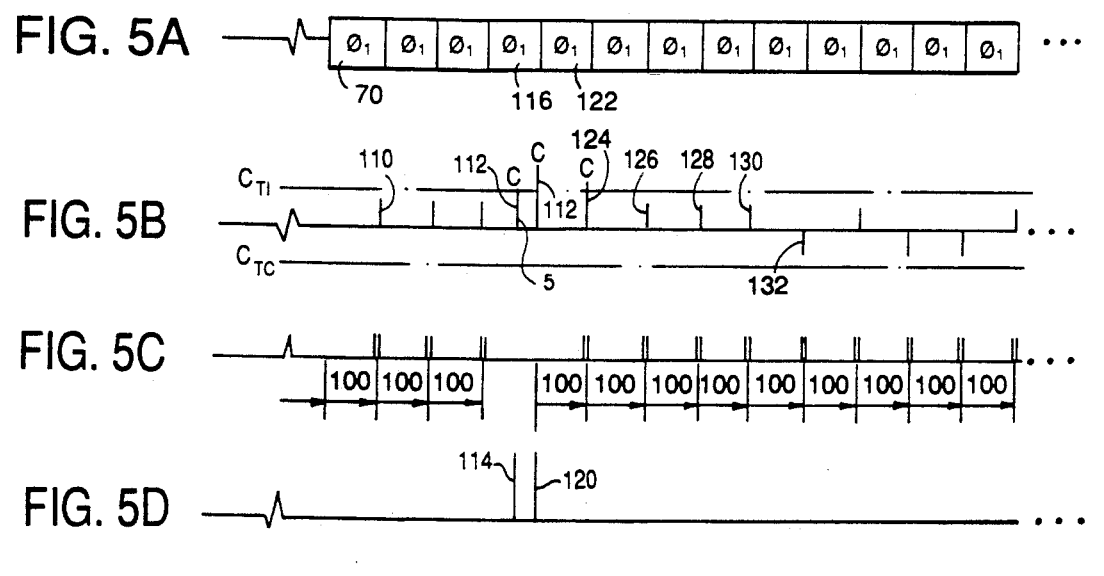
Figure 7A:
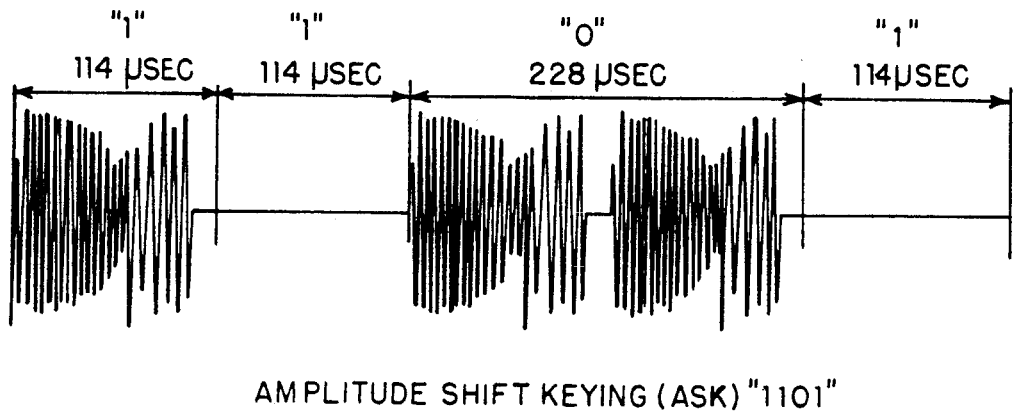
FIG. 7A is a plot of a typical series of chirps in the contention-resolution preamble.
Figure 7B:
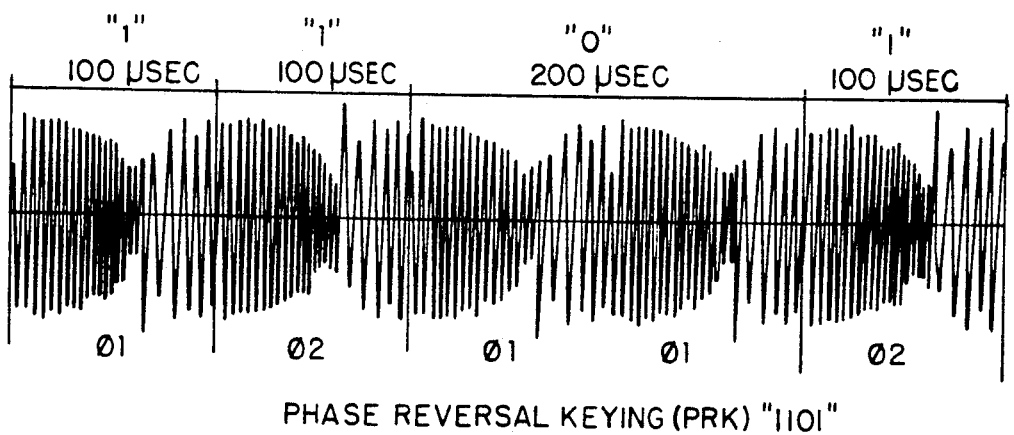
FIG. 7B is a plot of a typical series of chirps in the packet body.

The same frequency-swept chirps are used throughout the packet. Each chirp, as shown in FIGS. 7A and 7B, is swept in the range of 100 to 400 kHz and has a duration of 100 μsec. Each chirp is swept from approximately 200 kHz to 400 kHz and then from 100 kHz to 200 kHz. The chirps have one of two opposite phases—0° ($\phi_1$) or 180° ($\phi_2$). Differences in phase can be seen in FIGS. 7B, which show the actual shape of the chirp. In FIGS. 2 and 5A, the chirps are represented diagrammatically by boxes labelled with the two chirp phases $\phi_1$, $\phi_2$.

Any modem 12 connected to the communication medium may initiate a transmission. Resolution of overlapping contentions for the medium are resolved using the contention-resolution preamble 20. Before a transmitter contends for access to the communication channel, it must observe a quiet period of a prescribed length. The length is a function of the priority of the message, with high priority messages requiring shorter quiet periods than low priority messages. The length of the required quiet period is also randomized by having each transmitter add a further time interval of pseudo-random length to the interval prescribed by the priority of the message. A complete description of the priority scheme, as well as a description of other aspects of the preferred embodiment of the invention, can be found in the CEBus IS-60 Specification, available from the Electronic Industries Association, Washington, DC. The quiet periods are measured in integral numbers of 100-μsec USTs ("Unit Symbol Times"), and range in length from about four to twenty USTs in length. During a quiet period, the matched filter in the receiver must not produce an above-threshold correlator output. (See below for further description of USTs and threshold).

After a transmitter has detected the required quiet period, it begins sending preamble 20, an ASK (amplitude shift keying) sequence of chirps at a pitch of 114 μsec. The preamble consists of from eight to sixteen 114-μsec periods, in which a chirp is either present (superior state) or absent (inferior state). The length of the preamble is variable because it includes eight pulse-width-modulated symbols. A logical one is represented by a single 114-μsec interval followed by a change of state (e.g., a superior state followed by an inferior state). A logical zero is represented by two 114-μsec intervals in which the state remains the same followed by a change of state (e.g., two superior states followed by an inferior state). In the example shown in FIG. 2, the eight symbols are 01110111, and thus the preamble is ten 114-μsec periods long, with the two zero symbols using up two 114-μsec periods, and the six one symbols using only a single period apiece. As there are eight symbols in the preamble, there are 256 different possible preambles. The actual pattern used by any transmitter varies, and is assigned pseudorandomly (either by the modem or the host device). During the inferior states, when the modem is not sending a chirp, the modem listens for activity on the medium (i.e., a an above-threshold correlator output). If there is activity, the transmitter quits immediately, without sending the next chirp in the sequence. If there is not activity, the next chirp is sent. By the time the preamble sequence has been completed, a transmitter still sending is able to conclude, with a very low probability of error, that any other contending transmitters have withdrawn from contention.

If the transmitter survives the contention-resolution process, it immediately sends a start-of-packet symbol 22, which consist of a series of eight chirps of the same phase ($\phi_1$) followed by a chirp of the opposite phase ($\phi_2$). The chirps are transmitted at a pitch of 100 μsec. (The start-of-packet symbol may also be referred to as a Preamble-EOP symbol.) Immediately following the start-of-packet symbol is the data 24 of the packet. The start-of-packet symbol and data are transmitted using phase reversal keying (PRK). Changes in phase, rather than absolute phase, are used to encode information (except for the CRC, discussed later on).

FIGS. 3A-3C, 4A-4C, 5A-D, and 6 show the operation of the modem receiver in response to the transmission of FIG. 2. The receiver does not participate in the contention resolution process. It simply looks for chirps on the communication medium, and reacts identically to any chirp it detects, whether it be from the preamble, the start-of-packet symbol, or the data. FIGS. 3A, 4A, and 5B show the receiver correlator output, i.e., the output of the matched filter. Were the communication medium perfect, the matched filter in the receiver would always generate a corresponding series of spike-shaped correlation indications, such as the ones shown in FIG. 3A. Each correlation indication is generated at the moment in time at which the entire signal chirp has been received by the matched filter. If the received chirp matches closely with the expected chirp pattern, the degree of correlation will be high, generating a spike that exceeds either the positive correlation threshold $C_{T1}$ or the negative threshold $C_{T0}$ (which are set at approximately 40% of peak correlator output). Signals with a chirp of phase $\phi_1$ will cause spikes of one polarity, and signals with a chirp of phase $\phi_2$ will produce spikes of the opposite polarity.

Noise on the communication medium can result in deterioration of the correlation levels, as illustrated in FIG. 4A. Some of the correlator outputs will exceed threshold ("correlations"), but others will fall below threshold. In FIGS. 3A, 4A, and 5B the correlations are labelled with the letter C.

FIGS. 2 and 3A show the relationship of the correlator outputs (FIG. 3A) to the chirps (FIG. 2). A correlator output occurs at the trailing edge of each chirp. There are also three spurious correlations S shown in FIG. 3A. These result either from noise or from chirps put on the communication medium by other transmitters.

As noted earlier, processing gain is enhanced by basing decoding decisions simply on the polarity of the correlator output. If the correlator output is positive, the receiver records a $\phi_1$. If the output is negative, a $\phi_2$ is recorded. This makes the communication system much more tolerant of noise than would be the case if above threshold outputs were always required. The receiver must, however, receive an above threshold output every fourteen 100-μsec intervals, as confirmation that "carrier" is still present.

As currently implemented, the output of the matched filter is a number that varies from zero to a maximum, and the decision between $\phi_1$ and $\phi_2$ depends on whether the output is above or below the nominal, or midpoint, output of the filter. There is no midpoint value, and thus every correlator output is decoded as either $\phi_1$ or $\phi_2$. The matched filter is essentially a shift register with a large number of taps. The taps are summed, with half of the taps (e.g., those for which a perfectly received chirp would produce a logical zero) being inverted before summing, so that, for a perfectly received chirp, the output is either zero or a maximum.

Figure 6:
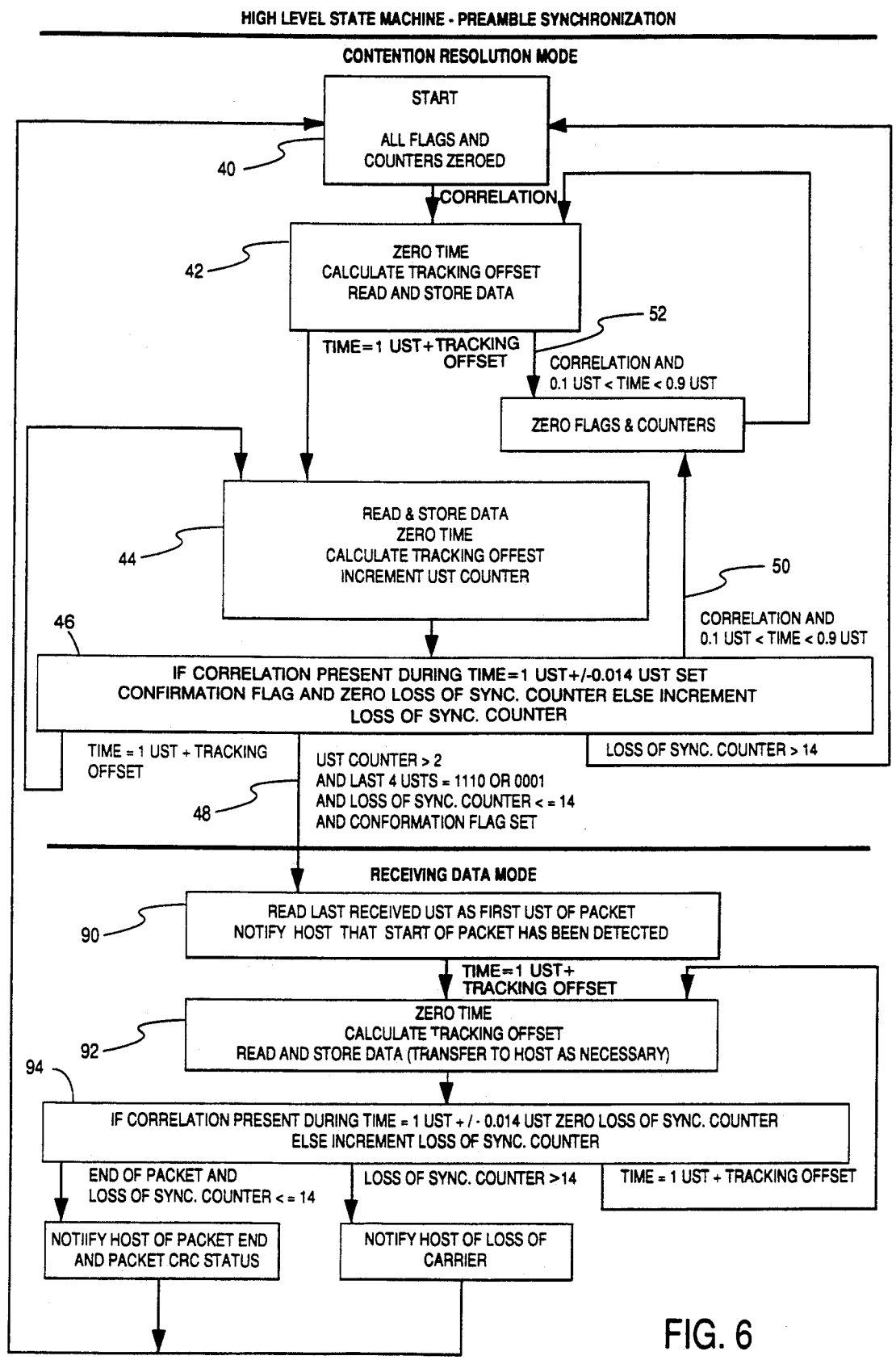
FIG. 6 is a state machine diagram illustrating the rules followed by a receiver to initiate reception of a data packet from the communication channel.

As shown in the state-machine diagram of FIG. 6, the contention resolution mode begins with all flags and counters zeroed (40). Upon detecting a correlation 30 (FIG. 3A), a resynch pulse 33 appears (FIG. 3C), resetting a 100-μsec timer ("ZERO TIME" in block 42) used to determine the next expected correlation position. A tracking offset is calculated, based on zero crossings of the correlator output on either side of the peak, and the amplitude of the correlator output 30 is read and stored ("READ AND STORE DATA" in block 42).

Approximately 100 μsec later (exactly 100 μsec if the tracking offset is zero), the 100-μsec timer triggers a sampling of the correlator output ("READ AND STORE DATA" in block 44). In FIG. 6, the expression "UST" refers to "Unit Symbol Time", which is the 100 μsec pitch of the chirps in the packet. The time at which a sample is taken of the correlator is prescribed by the expression, TIME = 1 UST + TRACKING OFFSET (i.e., when the timer reaches 100 μsec plus the offset, the correlator output is sampled).

The 100-μsec clock is then set back to zero ("ZERO TIME" in block 44), the tracking offset is calculated, and a "UST COUNTER" is incremented (at 44 in FIG. 6). The UST COUNTER keeps a count of the number of 100 μsec periods since the last resynchronization.

In addition to sampling the correlator output at precisely 100 μsec plus the tracking offset, the correlator output is also examined (at block 46, FIG. 6) in a narrow window (+/−0.014 UST, i.e., +/−1.4 μsec) to determine whether a correlation has occurred in the window (i.e., whether an above threshold correlator peak has occurred). If a correlation has occurred in the window, a CONFIRMATION FLAG is set (indicating that a second correlation at the expected 100μsec spacing has been detected), and a LOSS OF SYNC counter is zeroed. If no correlation is found, the LOSS OF SYNC counter is incremented by one.

The receiver continues to perform the operations of blocks 44, 46 (FIG. 6), i.e., sample the correlator output at approximately 100 μsec intervals and check for correlations within a narrow window around those 100 μsec intervals, until one of three events occurs: (1) a correlation occurs substantially away from the expected 100 μsec spacing, (2) the rules defining successful recognition of a start-of-packet symbol are met, or (3) the LOSS OF SYNC counter exceeds fourteen (meaning that fourteen 100 μsec periods have passed following the initial correlation without a second correlation).

If the first event occurs, all flags and counters are zeroed, and the receiver resynchronizes on the new correlation. Several examples of such resynchronization are shown in FIGS. 3A-3C. For example, correlations 35, 36, 37 each cause a resynchronization, as indicated by a pulse in the resynchronization signal (FIG. 3C). As indicated at 50, 52 in FIG. 6, a correlation will cause a resynchronization if it occurs outside of a 20 μsec block-out window centered on the expected correlation positions (or, more precisely, if 0.1 UST < TIME < 0.9 UST). Such an out-of-window correlation can occur even before the 100-μsec timer has reached 100 μsec, as in the case of correlation 37, which occurs less than 90 μsec after the receiver has resynchronized on correlation 36. In this case, leg 52 in the state diagram (FIG. 6) is the path followed. In other cases, resynchronization results when leg 50 interrupts the looping between blocks 44, 46.

During the contention-resolution preamble shown in FIGS. 2 and 3A-3C, no less than six resynchronizations occur. Some of the resynchronizations are the result of the 114 μsec pitch of the chirps in the preamble as transmitted in FIG. 2, and thus would occur even if only the transmitter represented by FIG. 2 were contending for access to the communication medium. But other resynchronizations occur as the result of spurious correlations produced either by simultaneously contending transmitters, or by noise.

This resynchronization allows the receiver to remain "agile", i.e., able to synchronize immediately on new correlations, so that it is ready to read the start-ofpacket symbol from whichever transmitter survives the contention resolution process.

Turning back to FIG. 6, the second event that drops the receiver out of the contention resolution mode is satisfaction of the rules defining successful recognition of a start-of-packet symbol. The rules are summarized at 48 in FIG. 6: (1) the UST counter must exceed a count of two (which, because of the particular organization of the logic, means that four correlator samples have been read without resynchronization); (2) the last 4 correlator samples have the pattern 1110 or 0001 (i.e., three occurrences of one polarity correlator output, followed by an occurrence of the other polarity); and (3) at least one confirming correlation at the expected 100-μsec pitch has been detected following the correlation that caused the last resynchronization. (A fourth condition is just a repetition of the LOSS OF SYNC rule addressed earlier, that there not have been more than fourteen 100-μsec intervals without a correlation.)

Thus, although the start-of-packet symbol is eight 100-μsec chirps in length, the receiver need not detect the entire pattern of chirps to conclude that the symbol has been received. What must happen is that in the period following a resynchronization there be a confirming correlation at the expected 100-μsec spacing as well as a detected pattern matching the end portion of the start-of-packet symbol (i.e., 1110 or 0001, meaning three correlator outputs of one polarity followed by a single output of the other polarity, thus corresponding to three $\phi_1$ chirps followed by one $\phi_2$ chirp, or three $\phi_2$ chirps followed by one $\phi_1$). Thus, there must be, altogether, two correlations, the one that initiated the resynchronization and the confirming correlation. These rules for recognizing a start-of-packet symbol are designed to increase the processing gain of that portion of the transmission so that it roughly matches the processing gain of the body of the packet (see discussion below).

FIGS. 2 and 3A-3C illustrate the rules for detection of the start-of-packet symbol. Chirp 60 (FIG. 2) produce correlation 62 (FIG. 3A) and a resynchronization pulse 64 (FIG. 3C). The receivers sample the correlator output at two 100-μsec spaced intervals following the resynchronization. But a further resynchronization is occasioned by the occurrence of chirp 70, the first chirp in the eight-chirp start-of-packet symbol. Correlation 72 is detected, causing resynchronization pulse 74. Again, however, only two 100μsec spaced correlator output samples are taken before still a further resynchronization. This latter resynchronization is not the result of anything transmitted by the transmitter represented by FIG. 2, but is the result of a spurious correlation 76, caused either by a transmitter (very unlikely, as the contention resolution rules should prevent such an occurrence in all but extremely rare circumstances) or communication-medium noise. Shortly after the spurious correlation is detected, another correlation 78 occurs following another one of the chirps in the start-of-packet symbol. After the resulting resynchronization, an unbroken string of correlator samples are taken at 100-μsec intervals, and the required pattern of four chirps of one phase followed by another of opposite phase is met when opposite polarity correlator output 80 is detected. At that moment, the receiver switches from contention-resolution mode to receiving data mode (FIG. 6).

Before turning to a discussion of the receiving data mode, a comparison should be made between FIGS. 3A-3C, which show operation of the receiver under ideal conditions in which correlator outputs are all above the thresholds $C_{T1}$, $C_{T0}$ (i.e., every one produces a correlation), and FIGS. 4A-4C and 5A-5D, which show cases in which the correlator outputs are often below threshold. The end result is the same; the start-of-packet symbol is recognized, but many fewer resynchronizations occur during the contention-resolution period and during reception of the start-of-packet symbol. The receiver manages to properly detect the start-of-packet symbol notwithstanding that most of the start-of-packet chirps are detected at below threshold. In FIGS. 4A-4C, the first chirp 70 does produce a correlation 102, but the next four chirps are detected at below threshold correlator outputs (although the correlator outputs have the correct polarity). But the spurious correlation 76 is detected, and causes a resynchronization. Finally, the sixth chirp in the start-of-packet symbol does produce a correlation 104, which resynchronizes the receiver. It is followed by two further chirps, each detected below threshold, and then by a reverse polarity correlation 106. That provides the minimum detected 1110 pattern. And the fact that the reverse polarity chirp 108 produced a correlation means that the second, and confirming, correlation is detected.

FIGS. 5A-5D show another case in which many of the chirps in the start-of-packet symbol produce below-threshold correlator outputs. (For simplicity, the preamble portion 20 shown in FIGS. 2, 3A-3C, and 4A-4C, is not repeated in FIG. 5A-5D.) In this example, chirp 70 does not produce correlation; the correlator output 110 is below threshold. Thus, the receiver continues to sample correlator outputs at 100-μsec intervals as the result of a prior resynchronization (not shown) during the preamble. The first correlation to occur in the start-of-packet symbol is spurious correlation 112 (also marked S in the figure). This produces a resynchronization pulse 114. Shortly thereafter, however, chirp 116 in the start-of-packet symbol produces a correlation 118 and corresponding resynchronization pulse 120. The very next chirp 122 provides the required confirming correlation 124. The remaining chirps of the start-of-packet symbol and the first few chirps of data all produce below-threshold correlator outputs. Yet the start-of-packet symbol is still detected, for each of the detection rules is met. The required 1110 (or 0001) sequence (correlator outputs 126-132) and confirming correlation 124 are both detected. As this case demonstrates, the confirming correlation need not correspond to the chirps forming the 1110 sequence. In particular, the reverse polarity correlator output 132 need not be above threshold (as in FIGS. 3A-3C and 4A-4C), as long as another confirming correlation is detected after resynchronization.

The choice of a 14 μsec difference between the preamble (114 μsec) and data (100 μsec) pitches, and the choice of a 20 μsec block-out window for resynchronization were both made in an effort to assure that the receiver successfully distinguishes between preamble and data chirps. Distortion from the communication channel can produce a burst of pulses at the correlator output instead of the simple pulse shown in the figures. This means that the correlator output being examined by the receiver may contain bursts of pulses spaced at 100 μsec intervals. To assure that the receiver does not confuse one of the pulses in a burst for a preamble pulse, the block out period is made large enough (+/−10 μsec) to span the entire burst. With the block out window set at +/−10 μsec it would theoretically be possible to set the preamble pitch at just slightly more than 10 μsec greater than the data pitch. But there is a further difficulty that makes it desirable to make the preamble pitch somewhat larger. A receiver may synchronize, when bursts are present, on an "off-center" pulse in the burst (i.e., not the maximum pulse at the center of the burst, but another above-threshold pulse within the burst). This off-center synchronization possibility means that a preamble chirp, if arriving only slight more than 10 μsec after the expected arrival time of a data chirp, might actually fall within the block out window, and not be seen. Using a 14 μsec difference between the two data pitches has been found to be adequate to surmount this difficulty. A greater difference in pitch could be used, but it would tend to lengthen the time required for contention resolution, and thus reduce the overall communication bandwidth.

Turning back to operation of the receiving data mode, that mode begins (FIG. 6) with the receiver first attending to making the last read chirp the first chirp of the data packet, and then notifying the host device that the start-of-packet symbol has been detected. Then, just as it did during the contention resolution mode, the receiver starts a 100-μsec timer, and samples the correlator output every 100 μsec (adjusted by tracking offsets). At each 100 μsec interval it performs the operations specified in blocks 92, 94—calculating the tracking offset, sampling the correlator output, transferring the data to the host device as necessary, and looking for a correlation during a narrow window surrounding the 100 μsec sampling time. If a correlation is found, the LOSS OF SYNC counter is zeroed. If not, the counter is incremented by one. If the LOSS OF SYNC counter ever exceeds 14, the host device is notified of "loss of carrier." A major difference from operation during contention resolution is that a spurious correlation received outside of the expected 100-μsec-spaced intervals is ignored; resynchronizing does not occur. The cycle of calculating tracking offset, sampling the correlator output, looking for a correlation in a narrow window, and moving forward by 100 μsec is repeated until an end-of-packet (EOP) symbol (four correlator outputs of the same phase, representing four chirps of the same phase) is detected. When the EOP symbol is detected, the modem examines the next sixteen chirps, which constitute the CRC, and notifies the host of the end of the packet and the status of the CRC.

To reduce the time required for transmission of the CRC, pulse-width modulation is not used. Instead, the CRC is transmitted using absolute phase, with, e.g., $\phi_1$ representing a logical one and $\phi_2$ representing a logical zero. This allows the 16-bit CRC to be transmitted with just 16 chirps. This is made possible, without compromising the polarity insensitivity of the modem, by assuring that the start-of-packet symbol is always transmitted as a series of $\phi_1$ chirps. If, because of a polarity reversal in the way modems are connected to the network, a receiver detects the start-of-packet symbol as a series of $\phi_2$ chirps, then for purposes of computing the CRC from the packet data and detecting the CRC, itself, the polarity of the received data is reversed. Furthermore, the CRC is calculated for the individual chirps in the data packet, not the pulse-width modulated USTs. This improves error detection, as errors that might be missed if the CRC was done for USTs can be detected.

Other embodiments are within the following claims.

I claim:

1. A receiver for decoding a spread spectrum transmission received from a communication channel on which a plurality of transmitters simultaneously contend for access, on which the transmitters contend by transmitting a preamble containing a preamble sequence of spread spectrum chirps spaced in time at a preamble pitch, and on which a transmitter gaining access to the channel transmits a data packet containing a sequence of spread spectrum chirps spaced in time at a data pitch, said data packet beginning with a predetermined initial sequence of spread spectrum chirps spaced in time at said data pitch, said data pitch being different from said preamble pitch, said receiver comprising:

first means for detecting a first chirp, and for detecting subsequent chirps occurring approximately at multiples of said data pitch following said first chirp;

second means for analyzing said first and subsequent chirps, to determine whether at least a portion of said detected first and subsequent chirps match at least a portion of said predetermined initial sequence;

third means, operative at least prior to successful matching of said first and subsequent chirps with said predetermined initial sequence, for detecting an out-of-synch chirp said out-of-synch chirp being a chirp that has occurred between times at which data chirps are expected based on said data pitch, and following detection of said out-of-synch chirp resetting said first and second means by using said out-of-synch chirp as said first chirp, thereby restarting the detection of chirps at said data pitch and restarting the determination of whether said detected chirps match said predetermined initial sequence; and fourth means, operative following a successful initial sequence; and fourth means, operative following a successful match, for detecting the data of said data packet.

2. A method of decoding a spread spectrum transmission received from a communication channel on which a plurality of transmitters simultaneously contend for access, on which the transmitters contend by transmitting a preamble containing a preamble sequence of spread spectrum chirps spaced in time by a preamble pitch, and on which a transmitter gaining access to the channel transmits a data packet containing a sequence of spread spectrum chirps spaced in time by a data pitch, the data packet beginning with a predetermined initial sequence of spread spectrum chirps spaced in time by the data pitch, the data pitch being different from the preamble pitch, the method comprising the steps of:

detecting a first chirp, and thereafter detecting subsequent chirps occurring approximately at multiples of the data pitch following the first chirp;

analyzing said first and subsequent chirps to determine whether at least a portion of the detected first and subsequent chirps match at least a portion of the predetermined initial sequence;

prior to completing a successful match again the predetermined initial sequence, looking for an out-of-synch chirp said out-of-synch chirp being a chirp that occurs at other than a multiple of the data pitch, and following detection of an out-of-synch chirp restarting the detecting and determining steps using the out-of-synch chirp as the first chirp; and following a successful match, detecting the data of said data packet.

3. The subject matter of claim 1 or 2, wherein said spread spectrum chirps are identical except for phase, there being chirps of a first phase and a second phase 180° different from the first phase, and wherein the same spread spectrum chirps are used in the preamble and data packet, and wherein detecting said chirps is performed using a matched filter that produces a correlator output when a chirp is detected, wherein the strength of the correlator output is inversely related to the degree to which a received chirp has been corrupted by noise, and wherein decoding correlator outputs are compared to predetermined thresholds.

4. The subject matter of claim 3 wherein said analyzing of said first and subsequent chirps includes requiring that said first chirp produce an above-threshold correlator output and that at least one of said subsequent chirps produce an above-threshold output.

5. The subject matter of claim 4 wherein said detecting of data following a successful match comprises detecting the correlator output at said data pitch, and accepting below-threshold outputs as valid so long as an above-threshold correlator output occurs at approximately said data pitch within at least a predetermined number of data pitch intervals.

6. The subject matter of 5 wherein said below-threshold outputs include outputs that are just above or below a nominal value.

7. The subject matter of claim 3 wherein said detecting of an out-of-synch chirp and restarting detection of chirps is terminated following said successful match.

8. The subject matter of claim 3 wherein said detecting of data following a successful match comprises detecting the correlator output at said data pitch, and accepting below-threshold outputs as valid so long as an above-threshold correlator output occurs at approximately said data pitch within at least a predetermined number of data pitch intervals.

9. The subject matter of 8 wherein said below-threshold outputs include outputs that are just above or below a nominal value.

10. The subject matter of claim 3 wherein, in detecting chirps, the data pitch time period is adjusted based on the time at which the actual peak occurs in the correlator output.

11. A transmitter for coding sequences of spread-spectrum chirps for transmission over a communication channel on which a plurality of transmitters simultaneously contend for access, said transmitter comprising:
means for transmitting a preamble containing a preamble sequence of spread spectrum chirps spaced in time by a preamble pitch;
means for determining whether other transmitters are also contending for transmission, by detecting whether a chirp is present on the channel during periods prior to and during the preamble when a chirp is not being transmitted by said means for transmitting; and
means, operative when it is determined that other transmitters are no longer contending for transmission, for transmitting a data packet containing a sequence of spread spectrum chirps spaced in time by a data pitch, the data packet beginning with a predetermined initial sequence of spread spectrum chirps spaced in time by the data pitch, the data pitch being different from the preamble pitch.

12. A method of encoding sequences of spread-spectrum chirps for transmission over a communication channel on which a plurality of transmitters simultaneously contend for access, said encoding method comprising the steps of:
transmitting a preamble containing a preamble sequence of spread spectrum chirps spaced in time by a preamble pitch;
determining whether other transmitters are also contending for transmission, by detecting whether a chirp is present on the channel during periods prior to and during the preamble when a chirp is not being transmitted by said means for transmitting; and
when it is determined that other transmitters are no longer contending for transmission, transmitting a data packet containing a sequence of spread spectrum chirps spaced in time by a data pitch, the data packet beginning with a predetermined initial sequence of spread spectrum chirps spaced in time by the data pitch, the data pitch being different from the preamble pitch.

13. The subject matter of claim 1, 2, 11 or 12 wherein said spread spectrum chirps are identical except for phase, there being chirps of a first phase and a second phase 180° different from the first phase, and wherein the same spread spectrum chirps are used in the preamble and data packet.

14. The subject matter of claim 13 wherein the preamble pitch is greater than the data pitch.

15. The subject matter of claim 14 wherein said out-of-synch chirp corresponds to an above-threshold correlator output occurring outside of a block-out window centered at the times at which correlator outputs corresponding to data chirps are expected based on said data pitch, and wherein the size of said block-out window is large enough to span the time period during which a burst of above-threshold correlator outputs corresponding to a data chirp is expected.

16. The subject matter of claim 15 wherein the difference between said preamble and data pitches is larger than one-half of the size of said block-out window.

17. The subject matter of claims 1, 2, 11, or 12 wherein said preamble is transmitted using ASK modulation, and said data packet is transmitted using PRK modulation.

18. The subject matter of claim 17 wherein said data packet is transmitted using pulse-width modulation, so that two chirps of the same phase followed by a phase reversal correspond to one logical state and a single chirp of the same phase followed by a phase reversal corresponds to another logical state.

19. The subject matter of claim 11 or 12 wherein said predetermined initial sequence of chirps contains a greater number of chirps than the receiver must detect for a successful match.

20. A method for receiving and decoding a spread spectrum transmission received from a communication channel on which a plurality of transmitters may simultaneously contend for access, and on which a transmitter gaining access to the channel transmits a data packet containing a sequence of spread spectrum chirps spaced in time at a data pitch, wherein there are two types of chirps, each substantially identical except that one has the opposite phase from the other, said method comprising the steps of:

passing the signal received from the communication channel through a matched filter to produce a correlator output, wherein perfectly received chirps produce a minimum or a maximum correlator output depending on their phase, and wherein a chirp corrupted by noise on the channel produces a correlator output short of the minimum or maximum;

sampling the correlator output at times at which an output is expected based on said data pitch;

comparing the sampled correlator output to predetermined thresholds;

accepting below-threshold outputs as valid data so long as an above-threshold correlator output occurs at approximately said data pitch within at least a predetermined number of data pitch intervals.

21. The method of claim 20 wherein an above-threshold correlator output is looked for within a narrow time window straddling the time at which a correlator output is expected based on the data pitch.

22. The method of claim 20 or 21 wherein information in the packets is represented using PRK modulation.

23. A method for communicating between a transmitter and a receiver across a communication channel, said method comprising the steps of:

transmitting information across the channel in the form of spread spectrum chirps grouped into packets, each packet containing a sequence of spread spectrum chirps spaced in time at a data pitch, wherein there are two types of chirps, each substantially identical except that one has the opposite phase from the other, the chirps in the data packet being divided into at least a start-of-packet symbol, data, and a cyclical redundancy code, wherein the data is transmitted using phase reversal (PRK) modulation in which there are two phases, the CRC is transmitted using absolute phase modulation, and the start-of-packet symbol is always transmitted with a portion containing chirps of a predetermined one of said two phases;

determining the phase of said portion of said start-of-packet symbol and, if the phase is opposite the predetermined phase, which indicates a net polarity reversal on the channel, inverting the data in computing a CRC, and, if the phase is not opposite the predetermined phase, computing a CRC without inverting the data;

comparing the computed CRC and the transmitted CRC to detect whether a decoding error has occurred.

24. The method of claim 23 wherein the data is transmitted using pulse-width modulation, wherein at least one logical state of a symbol is represented by a plurality of chirps, and wherein the CRC is based on individual chirps rather than on multi-chirp symbols.

* * * * *

UNITED STATES PATENT AND TRADEMARK OFFICE
CERTIFICATE OF CORRECTION

PATENT NO. : 5,278,862

DATED : 1/11/94

INVENTOR(S) : Timothy J. Vander Mey

It is certified that error appears in the above-identified patent and that said Letters Patent is hereby corrected as shown below:

On drawing sheets

FIG. 2, "RECIEVER" should be --RECEIVER--.

FIG. 6, "NOTIIFY" should be --NOTIFY--.

Col. 3, line 34, "(FIG. IB)" should be --(FIG. 1B)--.

Col. 10, lines 36-37, should be deleted in their entirety.

Col. 10, line 61, "again" should be --against--.

Col. 11, line 29, before "5" insert --claim--.

Col. 11, line 42, before "8" insert --claim--.

Col. 14, line 6, after "code," insert --(CRC)--.

Signed and Sealed this

Fifth Day of July, 1994

Attest:

BRUCE LEHMAN

*Attesting Officer*     *Commissioner of Patents and Trademarks*